(12) United States Patent
Gingrich et al.

(10) Patent No.: US 11,465,634 B1
(45) Date of Patent: Oct. 11, 2022

(54) AUTOMOBILE DETECTION SYSTEM

(71) Applicant: United Services Automobile Association (USAA), San Antonio, TX (US)

(72) Inventors: Jess Gingrich, San Antonio, TX (US); Heather Hernandez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/120,632

(22) Filed: Sep. 4, 2018

Related U.S. Application Data

(63) Continuation of application No. 15/190,846, filed on Jun. 23, 2016, now Pat. No. 10,131,362.

(60) Provisional application No. 62/183,271, filed on Jun. 23, 2015.

(51) Int. Cl.
| | |
|---|---|
| *B60W 50/00* | (2006.01) |
| *G05D 1/02* | (2020.01) |
| *G05D 1/00* | (2006.01) |
| *B60W 40/08* | (2012.01) |
| *B60R 25/04* | (2013.01) |

(52) U.S. Cl.
CPC ......... *B60W 50/0098* (2013.01); *B60R 25/04* (2013.01); *B60W 40/08* (2013.01); *G05D 1/0061* (2013.01); *G05D 1/021* (2013.01); *B60W 2040/0809* (2013.01); *B60W 2040/0818* (2013.01); *B60W 2040/0881* (2013.01)

(58) Field of Classification Search
CPC .................................................. B60W 50/0098
USPC ........................................................... 701/45
See application file for complete search history.

(56) References Cited

U.S. PATENT DOCUMENTS

| | | | | |
|---|---|---|---|---|
| 6,204,778 | B1 * | 3/2001 | Bergan | G08G 1/075 340/905 |
| 6,226,389 | B1 * | 5/2001 | Lemelson | G01S 19/11 382/104 |
| 6,577,947 | B1 * | 6/2003 | Kronfeld | G01C 21/00 701/301 |
| 6,850,824 | B2 * | 2/2005 | Breed | B60C 11/24 701/30.8 |
| 7,158,016 | B2 * | 1/2007 | Cuddihy | G08B 25/016 340/436 |
| 7,633,411 | B2 * | 12/2009 | Bitar | G01C 23/00 340/947 |
| 7,783,426 | B2 * | 8/2010 | Kato | B62D 15/025 701/300 |
| 8,483,895 | B1 * | 7/2013 | Beregi | G05D 1/0291 701/20 |
| 8,874,305 | B2 * | 10/2014 | Dolgov | B60W 40/06 701/31.9 |
| 8,982,207 | B2 * | 3/2015 | Jang | B64F 5/60 348/128 |
| 8,983,679 | B2 * | 3/2015 | Kitahama | G01C 21/34 701/1 |
| 9,070,293 | B2 * | 6/2015 | Roeber | G08G 1/09623 |

(Continued)

*Primary Examiner* — Jean Paul Cass
(74) *Attorney, Agent, or Firm* — BakerHostetler

(57) ABSTRACT

A method includes receiving sensor data from a sensor associated with a vehicle and determining a likelihood that the vehicle is experiencing an emergency condition based on the sensor data. The method also includes sending an alert indicative of the likelihood, the alert comprising at least a portion of the sensor data.

15 Claims, 3 Drawing Sheets

(56) References Cited

U.S. PATENT DOCUMENTS

| | | | | |
|---|---|---|---|---|
| 9,234,960 B1* | 1/2016 | McIntosh | | G01S 11/14 |
| 10,007,263 B1* | 6/2018 | Fields | | B60W 30/09 |
| 10,019,904 B1* | 7/2018 | Chan | | G08G 1/096708 |
| 10,086,782 B1* | 10/2018 | Konrardy | | G05D 1/0212 |
| 10,223,844 B1* | 3/2019 | Schwie | | G08B 17/10 |
| 10,282,625 B1* | 5/2019 | Wengreen | | G05D 1/0088 |
| 10,471,804 B1* | 11/2019 | Wengreen | | B60H 1/00828 |
| 10,479,319 B1* | 11/2019 | Wengreen | | E05B 81/56 |
| 10,493,952 B1* | 12/2019 | Schwie | | B60K 35/00 |
| 10,636,099 B1* | 4/2020 | Marlow | | G05D 1/0094 |
| 10,665,070 B1* | 5/2020 | Picardi | | G06N 20/00 |
| 10,719,886 B1* | 7/2020 | Konrardy | | G06Q 40/08 |
| 10,726,498 B1* | 7/2020 | Konrardy | | G08G 1/166 |
| 10,726,499 B1* | 7/2020 | Konrardy | | G07C 5/08 |
| 10,726,645 B2* | 7/2020 | Khalifeh | | G06Q 10/047 |
| 11,016,504 B1* | 5/2021 | Konrardy | | B60R 25/1001 |
| 2003/0014094 A1* | 1/2003 | Hammack | | A61F 7/12 |
| | | | | 607/105 |
| 2003/0204299 A1* | 10/2003 | Waldis | | B60K 31/0058 |
| | | | | 701/96 |
| 2005/0251335 A1* | 11/2005 | Ibrahim | | G01C 21/30 |
| | | | | 701/469 |
| 2006/0177270 A1* | 8/2006 | Rastegar | | E01C 9/007 |
| | | | | 404/71 |
| 2008/0059015 A1* | 3/2008 | Whittaker | | G08G 1/161 |
| | | | | 701/23 |
| 2008/0161989 A1* | 7/2008 | Breed | | B60R 21/01532 |
| | | | | 701/31.4 |
| 2009/0292468 A1* | 11/2009 | Wu | | G01S 13/867 |
| | | | | 701/301 |
| 2010/0228419 A1* | 9/2010 | Lee | | G05D 1/0246 |
| | | | | 701/25 |
| 2015/0066346 A1* | 3/2015 | Cheatham, III | | G08G 1/166 |
| | | | | 701/301 |
| 2016/0320308 A1* | 11/2016 | Liss | | G01N 21/783 |
| 2016/0347324 A1* | 12/2016 | Yoshitomi | | B60W 50/14 |
| 2017/0074663 A1* | 3/2017 | Giurgiu | | G05D 1/0212 |
| 2017/0305571 A1* | 10/2017 | Constans | | B64D 31/06 |
| 2017/0322033 A1* | 11/2017 | Wu | | G01C 21/206 |
| 2018/0022358 A1* | 1/2018 | Fung | | G06K 9/00845 |
| | | | | 701/36 |
| 2018/0025643 A1* | 1/2018 | Yamamoto | | B60W 30/09 |
| | | | | 701/23 |
| 2018/0126989 A1* | 5/2018 | Krabot | | B60W 30/18163 |
| 2018/0176727 A1* | 6/2018 | Williams | | A61B 5/747 |
| 2019/0340906 A1* | 11/2019 | Williams | | G08B 15/00 |
| 2020/0051189 A1* | 2/2020 | Williams | | H04L 67/12 |

\* cited by examiner

AUTOMOBILE DETECTION SYSTEM

CROSS REFERENCE TO RELATED APPLICATION

This application is a continuation and claims priority to U.S. Ser. No. 15/190,846, filed on Jun. 23, 2016, which application claims priority to U.S. Provisional Patent Application No. 62/183,271, filed Jun. 23, 2015, the content of which is incorporated herein by reference in its entirety.

TECHNICAL FIELD

The technical field relates generally to vehicles and, more specifically, to monitoring vehicles.

BACKGROUND

The development and ubiquity of electronics in our daily lives has greatly increased the ease with which we can conduct many of our activities, but many developments remain left untapped.

Accordingly, there is an unmet need for systems and methods to facilitate activities related to utilizing the connected nature of vehicle owners, their vehicle, and the insurance company that insures the vehicle and driver.

SUMMARY

In an aspect, this disclosure is directed to a method. The method may include receiving sensor data from a sensor associated with a vehicle and determining a likelihood that the vehicle is experiencing an emergency condition based on the sensor data. The method may also include sending an alert indicative of the likelihood, the alert comprising at least a portion of the sensor data.

According to another aspect, this disclosure is directed to a system. The system may include a sensor associated with a vehicle and a processor. The system may also include memory storing computer-readable instructions that cause the processor to effectuate operations. The operations may include receiving data from the sensor and analyzing the data to identify a condition of the vehicle. The operations may also include sending an alert indicative of the condition.

In another aspect, this disclosure is directed to a method. The method may include receiving data from a sensor of a vehicle and analyzing the data to identify a condition of the vehicle. The method may also include sending a command to a component of the vehicle based on the condition.

BRIEF DESCRIPTION OF THE DRAWINGS

Aspects of the automobile detection and management system are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

A component or a feature that is common to more than one drawing is indicated with the same reference number in each of the drawings.

DETAILED DESCRIPTION

The present disclosure is directed to an automobile detection and management system. It is to be appreciated the subject matter is described below more fully with reference to the accompanying drawings, in which illustrated examples are shown. The present disclosure is not limited in any way to the examples described below, as these examples can be implemented in various forms, as appreciated by one skilled in the art. Therefore, it is to be understood that any structural and functional details disclosed herein are not to be interpreted as limiting, but merely as a basis for the claims and as a representative for teaching one skilled in the art to implement, use, and test the disclosed technology. Furthermore, the terms and phrases used herein are not intended to be limiting but rather to provide an understandable description.

Unless defined otherwise, all technical and scientific terms used herein have the same meaning as commonly understood by one of ordinary skill in the art. Although any methods and materials similar or equivalent to those described herein can also be used, exemplary methods and materials are now described.

As used herein and in the appended claims, the singular forms "a," "an," and "the" include plural referents, unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain implementations as discussed below may include software algorithms, programs or code residing on computer useable medium having control logic for enabling execution on a machine having a computer processor. The machine may include memory storage configured to provide output from execution of the computer algorithm or program. As used herein, the term "software" is meant to be synonymous with any code or program that can be in a processor of a host computer, regardless of whether the implementation is in hardware, firmware, or as a software computer product available on a disc, a memory storage device, or for download from a remote machine. The examples described herein include such software to implement the equations, relationships, and algorithms described above. Further, although at least one series of steps are presented as an example, it will be appreciated by those skilled in the art that the steps identified may be practiced in any order that is practicable, including, without limitation, the omission of one or more steps.

Figure 1:
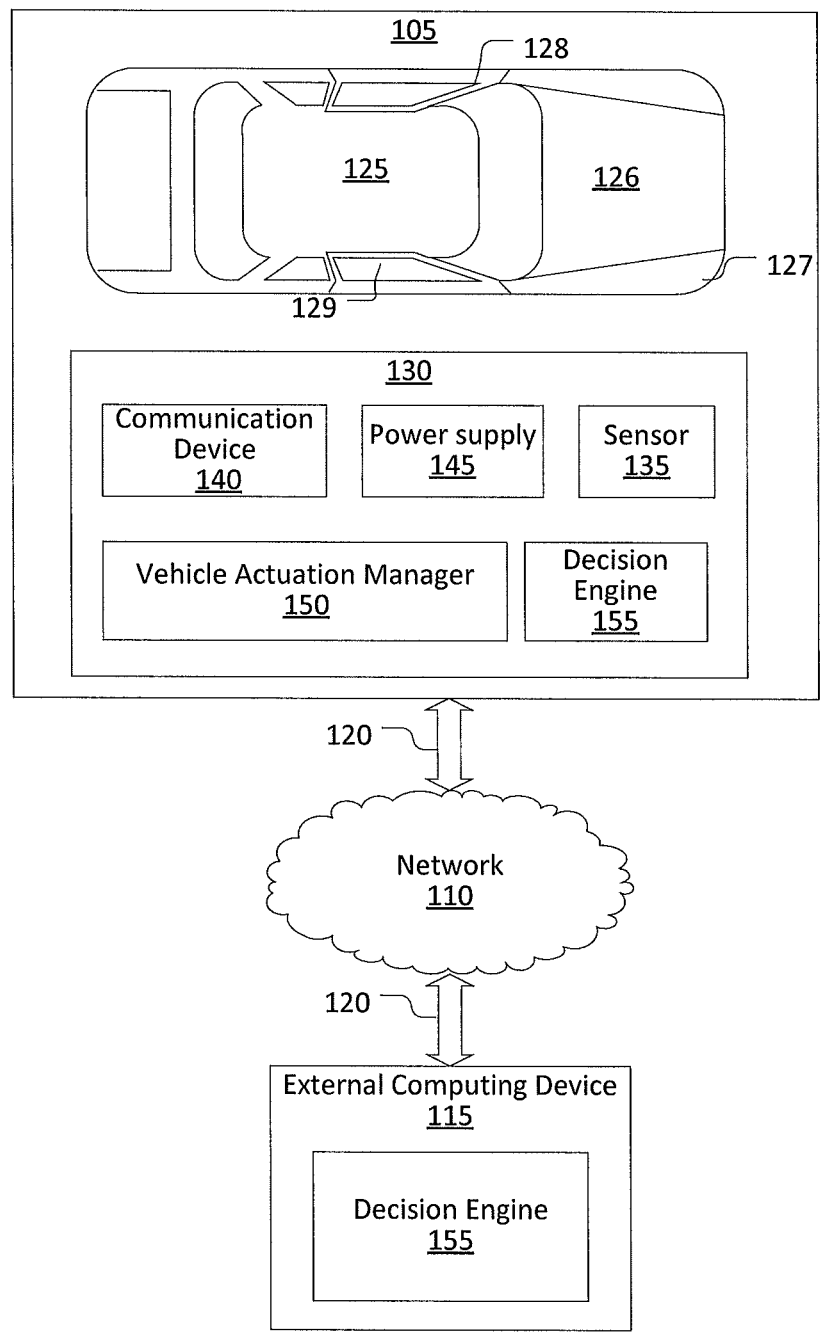
FIG. 1 depicts an exemplary system for practicing the systems and method(s) described herein.

FIG. 1 depicts a system 100, which may include a vehicle module 105 that may communicate through a network 110 with an external computing device 115. Network 110 depicted in FIG. 1 may include a local area network (LAN), a wide area network (WAN), a personal area network (PAN), or the like. Such networking environments may be found in offices, enterprise-wide computer networks, intranets, and the Internet. For instance, when used in a LAN networking environment, the system 100 is connected to the LAN through a network interface or adapter (not shown). When used in a WAN networking environment, the computing system environment may include a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device. Communications over network 110 may be facilitated through one or more communications links 120 formed between data interfaces. Communication links 120 may comprise wired or wireless links. Communication links 120 illustrated in FIG. 1 are exemplary and other means of establishing a communications link between multiple devices may be used.

Vehicle module 105 may include a vehicle 125 and a management module 130. Vehicle may include any and all systems or components that are available in vehicles, including, without limitation, a power system and drive system 126, which may include an engine, battery, fuel system, drive train, wheels, brakes, or the like; a lighting system 127, which may include LED or lamps; the car body 128, which may include a roof, doors, and windows; and an interior 129, which may include seats, seatbelts, and a steering wheel.

Management module 130 may include a sensor 135, a communications device 140, a power supply 145, a vehicle actuation manager 150, and a decision engine 155. Sensor 135 may include one or more of an accelerometer, a microphone, a camera (that may or may not be limited to gathering light in the visible wavelengths, and that may gathering a series of images (e.g., video), or distinct static images), a humidity/moisture sensor, an atmospheric sensor (e.g., a sensor to determine gasses, particles, or pollution in the air), a GPS system, a gyroscope, a Bluetooth or other radio frequency-based identification of devices in the vicinity.

Management module 130 may obtain power from a dedicated power supply 145. This power supply 145 may be fully or partially recharged or charged by power system and drive system 126. Thus, management module 130 may operate via power from vehicle 125 (either via power supply 145 or power system and drive system 126) and if vehicle 125 stops supplying power to management module 130 then management module 130 may receive power from power supply 145. Further, as mentioned above, management module 120 may receive data from vehicle 125 (e.g., that lights of lighting system 127 are still on).

In an aspect, vehicle actuation manager 150 may be enabled to control some or all of the functionality associated with vehicle 125. Thus, vehicle actuation manager 150 has control over power system and drive system 126. For example, vehicle actuation manager 150 may be able to toggle between two wheel drive and four wheel drive. Vehicle actuation manager 150 may receive data from one or more sensors 135 and utilizes that data. For example, vehicle actuation manager 150 may receive data from a camera sensor 135 to determine if it is safe to move vehicle 125 in a certain direction. Vehicle actuation manager 150 may control sensor 135, either directly or indirectly (e.g., request or command a camera to rotate/move/zoom in or out).

In FIG. 1, decision engine 155 may be located in both vehicle module 130 as well as external computing device 115. The functionality, including the analysis, may occur on both vehicle module 130 as well as external computing device 115. This may occur by individual analysis or determinations being partially completed on one decision engine 155 and finished on the other decision engine 155. In another use case, the analysis distribution may occur via entire analytics being performed exclusively on a single decision engine 155. Thus, the distribution of analytics would be via individual decision potentially being performed at different locations. Thus, it is contemplated herein that decision engine 155 may be located at vehicle module 130 or external computing device 115.

External computing device 115 may be any computer device that can communicate to at least a portion of vehicle module 105 through network 110. For example, external computing device 115 may comprise one or more of a mobile device (e.g., of a driver, passenger, or bystander), a server, another network device, or the like.

Figure 2:
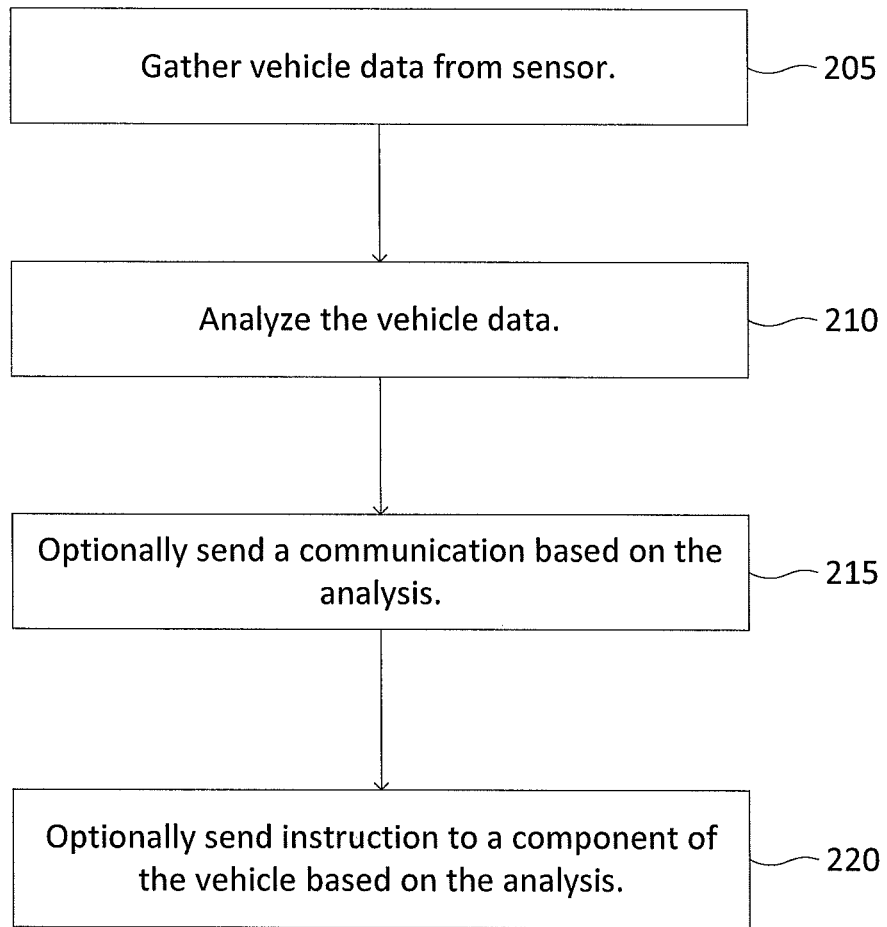
FIG. 2 is a flowchart depicting illustrative operation of the system of FIG. 1.

FIG. 2, illustrates an exemplary method 200 such as might be utilized in coordination with the system in FIG. 1. At step 202, method 200 may include gathering data about vehicle 125. For example, data may be gathered from one or more sensors 135. This data may include operating data, temperature data, audio data, visual data, location/proximity data, humidity data, or any other data that may be relevant to the status or condition of vehicle 125, its environment, its driver, its passenger, or the like.

At step 210, the vehicle data is analyzed. For example, the data could be analyzed to determine what people or network devices are in vehicle 125. This may include receiving data from sensor 135 including a microphone and analyzing audio data recorded or captured by the microphone. This may include identifying the number of unique or distinct voices within vehicle 125. This may also include determining the identity associated with specific voices, such as by identifying a person whose speech patterns are known. The presence of certain networked devices (e.g., smart phone, smart watch, Fitbit® devices, or the like) can be used in conjunction with data inputs (audio) to enhance the certainty of the determinations relating to the presence of individuals in the vehicle.

As another example, analysis of audio data may be used to determine if person(s) are trespassing in vehicle 125. For example, if vehicle 125 is locked, and it has not been legitimately unlocked (or if vehicle has been improperly unlocked), then voices emanating from within vehicle 125 would be a strong indication of illegal activity. This analysis may account for situations in which vehicle 125 has at least one window that is open, then the analysis of the voice(s) may bear that in mind, and determine that the voice, which otherwise sounds like it is emanating from within the car, is actually originating from outside of vehicle 125.

In another example, based on audio analysis, it may be determined that vehicle 125 is being subjected to hail. For example, based on audio analysis, a confidence factor quantifying the likelihood that vehicle may have experienced hail damage may be generated. Additionally or alternatively, the hail damage confidence factor may be based on weather data received by a cloud service connected to vehicle module 105 or decision engine 155. If the confidence factor exceeds a predetermined threshold, then it is determined that vehicle is likely being subjected to hail.

In another exemplary use case, sensors 135 may comprise one or more gyroscopes that output data indicative of the orientation of vehicle 125. Based on this information, it may be determined that the orientation of vehicle 125 is problematic. For example, if the car is being operated by a person, and data from sensor 135 indicates that the vehicle 125 is not upright (e.g., on its side or upside down), then it may be determined that vehicle 125 has been in an accident. In another example, if vehicle 125 is not being operated and is expected to be sitting still, but data from sensor 135 indicates vehicle 125 is moving, then such data may be interpreted to mean that vehicle 125 is being stolen, has been placed on jacks for the wheels to be stolen, has suffered a braking failure, or is being towed (for example). One or more of a combination of factors may be used to enhance certainty of the decision. For example, if a gyroscope or accelerometer of sensor 135 indicates a change when vehicle 125 is in a parked state indicating its orientation has changes and vehicle module 110 registers a loss of connection to the wireless pressure sensors in tires, then the conclusion that the tires are being stolen may be more certain.

In an aspect, sensors 135 may comprise a plurality of accelerometers may be oriented so as to measure different axes. For example, accelerometers may be oriented based on the three-dimensional Cartesian system. Optionally, the plurality of accelerometers may be oriented with respect to each other via any angles. The array of accelerometers in vehicle 125 may provide indication of the severity of an accident for individuals at any location in vehicle 125. This information can be provided to emergency responders or insurance company to identify the number of persons involved in the accident and an estimated severity of their respective injuries.

In another aspect, as vehicle 125 is being towed, its path may be tracked by one or more sensors 135. Thus, it may be determined if the tow truck used the efficient, fastest, or shortest route. Sensor data captured during towing may be used to determine if vehicle 125 was damaged during the tow (e.g., via sensors 135 detecting a large bump, hearing an object striking the car, etc.).

As another example, analysis of data from sensors 135 associated with an unoccupied vehicle 125 may decrease the chances of vehicle 125 being stolen. In an aspect, the analysis may be based on several factors, such as the parking spot of vehicle 125, the time of day (e.g., night time may be more likely for criminal activities), the weather (e.g., rain may help mask the sound of breaking into vehicle 125). The analysis may be based on the criminal history of the location of vehicle 125. For example, if the crime density of the current location of vehicle 125 is high, then the sensitivity thresholds by which the sensor data is measured may be lowered. If one of the indicators for determining tamper is activated then vehicle module 105 will read the control area network (CAN) of vehicle 110 to see if any of the connected nodes are no longer responding. Unresponsive nodes indicate a portion of the bus has been disconnected. This is often the case when a catalyst has been removed or the infotainment has been removed.

In another exemplary use case, vehicle 125 is occupied by a non-adult, such as a child or a pet, temperature data may be analyzed to determine if it exceeds a threshold. The temperature analysis may be based on the temperature of vehicle 125, ambient temperature, or forecasted temperature. In another exemplary use case, the temperature and/or amount of sun received may be monitored, such as on an on-going basis. This information may be utilized to inform analysis regarding whether a stress level threshold of a component of interior 129 (e.g., leather seats), has been exceeded. The stress level threshold may be objectively set. Additionally or alternatively, the stress level threshold may be customized, such as based on vehicle 125 or its owner.

In another exemplary use case, the power supply of vehicle 125 may be monitored. For example, power supply 145 may be monitored to determine if the charge of a battery of vehicle 125 or fuel in the gas tank of vehicle 125 is below a threshold. Sensor data may also indicate that one or more elements of vehicle 125, such as lighting system 127, is drawing power from the power supply of vehicle 125. For example, the data may indicate the headlights are running while vehicle 125 is otherwise not being used. As another example, the current draw from the battery may be monitored, such as when vehicle 125 is cranking. The current profile may change over time depending on the fitness of the starter, valve train, or powertrain. In another exemplary use case, the energy utilized by components may be monitored to inform a determination of the health of that component. For example, lamps or LEDs of lighting system 126 will consume a known amount of power when turned on. Thus, it may be determined that lamps or LEDs have failed if the power consumption may be at different level. Thus, different power levels may be monitored and analyzed.

Step 210 may include analyzing brake sensor data to monitor the level of depression of the brake pedal and relate that to deceleration of vehicle 125. Changes in this relationship over time can be used to determine the health of the braking system.

Step 210 may include analyzing sensor data to determine information regarding the occupants of vehicle 124. For example, the identity of occupants in the vehicle may be determined, such as based on voice recognition, image recognition, fingerprint recognition, or the like. As another example, it may be determined whether someone is smoking or drinking in vehicle 125, such as based on analysis of the air or imagery of interior 129. Analysis of body language or driving patterns may indicate the driver of vehicle 125 is impaired (e.g., from fatigue, distractions, illness, or the influence of drugs). Analysis of vehicle 125 and occupants may include an analysis of items in vehicle 125 and a determination of whether any of those contents are stolen. This may be determined based on receiving an indication of items that have recently been stolen, or it may be determined based on imagery data being communicated to external computing device 115 or decision engine 155.

At step 215, method 200 may include sending a communication based on the analysis performed in step 210. For example, a communication may indicate a threshold level has been exceeded. This communication may be sent to the driver, vehicle occupants, other vehicles 125 in the vicinity, law enforcement, insurance companies, or other third-party service providers. For example, an alert may be sent (e.g., to police, to the owner of vehicle 125), if the analysis indicates that illegal activity may be occurring. The communication may include certain data, such as audio or other sensor data captured at or near vehicle 125.

In the event of the analysis indicates possible weather damage to vehicle 125, the notification may indicate vehicle 125 may be subjected to damaging weather. If the user is unavailable to move the vehicle then they can authorize the device (e.g., via vehicle actuation manager 125) to autonomously move the vehicle to a sheltered location.

In the event the analysis indicates vehicle 125 is occupied and the temperature inside vehicle 125 has exceeded (or will exceed) a threshold, alert may be sent (e.g., to the owner, law enforcement).

Based on the analysis, the fitness of the engine system may be predicted, and alerts can be sent to owner that recommend certain maintenance or repairs. For example, the battery health may inferred from the current draw profile during cranking. Weak cells can be identified, and notifications may be sent to repair or replace weak cells. Then a notification can be sent to the vehicle owner that they need to replace the component. Advice on brake maintenance can be provided based on the trend of the measured relationship.

In such situations where the performance of a component is identified to differentiate as compared to other times and/or an objective standard for how the component should operate, then a warning message may be sent, such as to the owner of vehicle 125 or to local mechanics who can bid on the price to fix vehicle 125.

In another exemplary use case, if it is determined that gasses in/around the vehicle are reaching and/or will be reaching poisonous levels (e.g., too much carbon dioxide, carbon monoxide, and/or any other gas), then (1) a warning message may be sent to the vehicle's owner and/or the police, and/or (2) any component of the vehicle the produces that gas (e.g., a combustion engine typically produces carbon monoxide and carbon dioxide) may be disabled so as to mitigate/prevent the additional creation of that gas. In the case that the vehicle is stationary, if the carbon monoxide/dioxide level is increase to a point that is hazardous to an occupant; the vehicle can be turned off. If the vehicle is in motion then the driver will be notified that they have a ingress issue and the routes of entry should be inspected.

If analysis indicates that the occupants include unauthorized passengers (e.g., some states require that a new driver cannot drive with a non-sibling passengers below a certain age), a warning email may be sent to the vehicle owner, occupants' parents, or law enforcement. If analysis indicates the driver is impaired, then a warning may be sent to the driver, vehicle owner, or authorities. In another exemplary use case, the analysis may indicate that, based on traffic or weather on the route, alternate routes may be preferred. This information may be relayed to the owner, driver, or other occupants of vehicle 125.

At step 220, method 200 may include sending an instruction to vehicle 125. For example, commands to the vehicle may invoke actions on an installed device with data acquisition nodes or to a vehicle control unit, such as vehicle actuation manager 150, which controls motive operation and other vehicle functionality. For example, if voices and/or sounds are detected within (or even nearby) vehicle 125, then other sensors 2 (e.g., cameras) may be initiated and data from those sensors may be gathered, analyzed, and/or promulgated (e.g., to the vehicle owner and/or police). As another example, commands may be sent to vehicle 125 to cause vehicle 125 to relocate to a safer location (e.g., to avoid further hail damage), or deploy a defense mechanism against damage, such as a protective tent.

In the case a notification has been sent indicating that the temperature of an occupied vehicle 125 has exceeded (or will exceed a threshold) without subsequent response, the systems and/or methods described herein can command the vehicle windows be lowered to lower the interior temperature. In the case that is still not sufficient, the systems and/or methods described herein can command the car to start the engine and idle with the A/C unit and fan to turn on.

If the battery is getting low on power, and/or it is projected to go low on power, a warning message may be sent to the vehicle's owner and/or the offending component (in this example, the headlight) may be disengaged. For example, when the battery gets below a first predetermined threshold (e.g., 25%) then a warning communication is sent, and when the battery gets below a second predetermined threshold (e.g., 10%) then a command is sent to the vehicle to disengage the electricity-utilizing component(s).

In another exemplary use case, the operation of the vehicle may be monitored and adjusted. For example, if the driver is driving very aggressively (hard turns, fast acceleration and deceleration), then the vehicle may be instructed to soften the controls, such that the acceleration/deceleration and/or turning may be not quite as drastic as the driver had been operating the vehicle.

In another exemplary use case, if it is determined that the driver is impaired, then the driver's control of vehicle 125 may be disabled (even if it is currently being driven), and vehicle 125 may drive itself to a safe location to stop.

Figure 3:
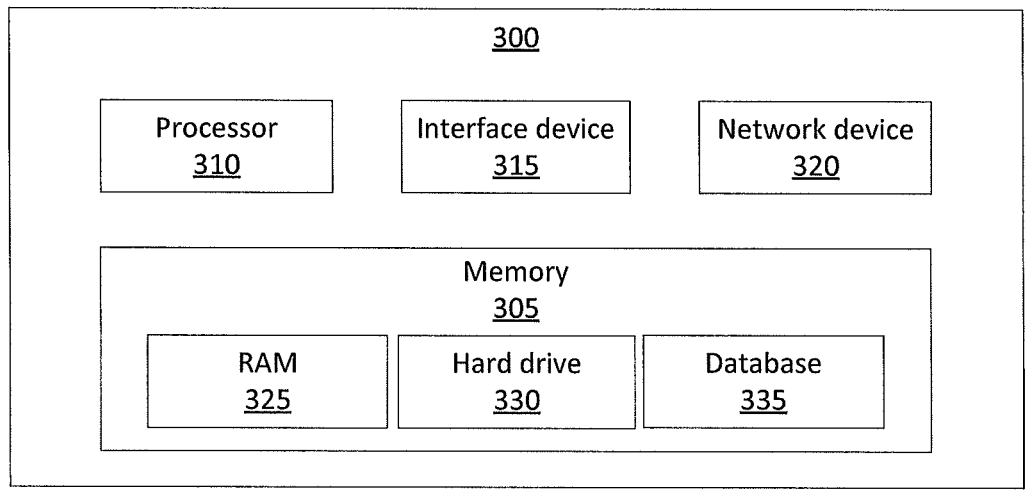
FIG. 3 depicts an exemplary computing device as might be utilized in coordination with the systems and methods described herein.

FIG. 3 illustrates an exemplary computing device 300 that may be used as part of the systems and methods described herein. Computing device 300 may include a memory 305, a processor 310, an interface device 315 (e.g., mouse, keyboard, monitor), and a network device 320. Memory 305 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over network 110. In one example, memory 305 includes a series of computer instructions written in or implemented with any of a number of programming languages, as will be appreciated by those skilled in the art.

Memory 305 may include RAM 325, a hard drive 330, or a database 335. For example, database 335 may include or store information, such as information that relates to users, parties, or vehicle modules 105 interacting with system 100.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 305 or separately in any of hardware (e.g., electronic circuitry), firmware, software, or a combination thereof. Engines/modules may contain instructions for controlling processor 310 to execute the methods described herein.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods have been described with respect to the examples disclosed above, those skilled in the art will readily appreciate that changes and modifications may be made thereto without departing from the spirit and scope of this disclosure.

What is claimed is:

1. A system for managing an autonomous vehicle comprising:
   a sensor aboard the autonomous vehicle, wherein the sensor is configured to collect sensor data related to the autonomous vehicle;
   a communications device associated with the vehicle and operatively coupled with the sensor and a vehicle actuation manager, wherein the communications device is configured to transmit the sensor data;
   a processor;

non-transitory memory storing computer-readable instructions that cause the processor to effectuate operations, the operations comprising:
receiving, via the communications device, the sensor data from the sensor indicating probable damage to the autonomous vehicle;
analyzing the sensor data using a decision engine to determine a confidence factor associated with the probable damage to the autonomous vehicle;
based on the confidence factor meeting a threshold value, determining an occurrence of damage;
sending a command to the vehicle actuation manager via the communications device to move the autonomous vehicle to a safe location in response to the damage; and
based on the damage to the autonomous vehicle and the safe location, determining a towing route for the autonomous vehicle; and
sending an alert to one or more of an operator of the autonomous vehicle, an owner of the autonomous vehicle, or authorities.

2. The system of claim 1, wherein the sensor data includes data reflecting body language of an operator of the autonomous vehicle, wherein the body language is analyzed to determine a hazard.

3. The system of claim 1, wherein the sensor data includes data reflecting driving patterns of the autonomous vehicle, wherein the driving patterns are analyzed to determine a hazard.

4. The system of claim 1, wherein analyzing the sensor data detects excessive fatigue in an operator of the autonomous vehicle.

5. The system of claim 1, wherein analyzing the sensor data detects the presence of drugs.

6. The system of claim 1 wherein the command overrides control of the vehicle by an operator.

7. A method comprising:
receiving, via a communications device associated with an autonomous vehicle, sensor data indicating probable damage to the autonomous vehicle from a sensor aboard the autonomous vehicle, wherein the communications device is operatively coupled with the sensor and a vehicle actuation manager, and wherein the communications device is configured to transmit the sensor data;
analyzing the sensor data using a decision engine to determine a confidence factor associated with the probable damage to the autonomous vehicle;
based on the confidence factor meeting a threshold value, determining an occurrence of damage;
sending a command to the vehicle actuation manager via the communications device to move the autonomous vehicle to a safe location in response to the damage; and
sending an alert indicative of the condition to one or more of an operator of the autonomous vehicle, an owner of the autonomous vehicle, or authorities; and
based on the damage to the autonomous vehicle and the safe location, determining a towing route.

8. The method of claim 7, wherein the sensor data includes data reflecting body language of an operator of the autonomous vehicle, wherein the body language is analyzed to determine a hazard.

9. The method of claim 7, wherein the sensor data includes data reflecting driving patterns of the autonomous vehicle, wherein the driving patterns are analyzed to determine a hazard.

10. The method of claim 7, wherein analyzing the sensor data detects excessive fatigue in an operator of the autonomous vehicle.

11. The method of claim 7, wherein analyzing the sensor data detects the presence of drugs.

12. The method of claim 7, wherein the command overrides control of the autonomous vehicle by an operator.

13. A non-transitory computer-readable medium storing computer-readable instructions that when run effectuate aspects including:
receiving, via a communications device associated with an autonomous vehicle, sensor data indicating probable damage to the autonomous vehicle from a sensor aboard the autonomous vehicle, wherein the communications device is operatively coupled with the sensor and a vehicle actuation manager, and wherein the communications device is configured to transmit the sensor data;
analyzing the sensor data using a decision engine to determine a confidence factor associated with the probable damage to the autonomous vehicle;
based on the confidence factor meeting a threshold value determining an occurrence of damage;
sending a command to the vehicle actuation manager via the communications device to move the autonomous vehicle to a safe location in response to the damage; and
send an alert indicative of the condition; and
based on the damage to the autonomous vehicle and the safe location, determining a towing route.

14. The non-transitory computer-readable medium of claim 13, wherein the command overrides control of the autonomous vehicle by an operator.

15. The non-transitory computer-readable medium of claim 13, wherein the sensor data includes data reflecting driving patterns of the autonomous vehicle, wherein the driving patterns are analyzed to determine a hazard.

* * * * *